US008064687B2

(12) United States Patent
Rouge et al.

(10) Patent No.: US 8,064,687 B2
(45) Date of Patent: Nov. 22, 2011

(54) FINE STEREOSCOPIC IMAGE MATCHING AND DEDICATED INSTRUMENT HAVING A LOW STEREOSCOPIC COEFFICIENT

(75) Inventors: Bernard Rouge, Toulouse (FR); Hélène Vadon, Toulouse (FR); Alain Giros, Castelginest (FR)

(73) Assignee: Centre National d'etudes Spatiales, Paris (FR)

( * ) Notice: Subject to any disclaimer, the term of this patent is extended or adjusted under 35 U.S.C. 154(b) by 0 days.

(21) Appl. No.: 12/717,045

(22) Filed: Mar. 3, 2010

(65) Prior Publication Data

US 2010/0239158 A1      Sep. 23, 2010

Related U.S. Application Data

(63) Continuation of application No. 10/594,257, filed as application No. PCT/FR2005/000752 on Mar. 29, 2005.

(30) Foreign Application Priority Data

Mar. 26, 2004   (FR) ...................................... 04 03143

(51) Int. Cl.
*G06K 9/00*      (2006.01)
(52) U.S. Cl. ........ 382/154; 382/173; 382/175; 382/176; 382/177; 382/178; 382/179; 348/231.3; 348/231.6; 348/129; 348/161; 348/225; 348/345
(58) Field of Classification Search .................. 382/154, 382/173, 175, 176, 177, 178, 179; 348/231.3, 348/231.6, 129, 161, 225, 345
See application file for complete search history.

(56) References Cited

U.S. PATENT DOCUMENTS

| 5,550,937 | A | 8/1996 | Bell et al. |
| 5,963,664 | A | 10/1999 | Kumar et al. |
| 5,995,681 | A | 11/1999 | Lee et al. |
| 7,711,181 | B2 * | 5/2010 | Kee et al. ...................... 382/154 |
| 2002/0113864 | A1 | 8/2002 | Borner et al. |
| 2002/0135468 | A1 | 9/2002 | Bos et al. |
| 2004/0066970 | A1 * | 4/2004 | Matsugu ....................... 382/217 |
| 2008/0089558 | A1 * | 4/2008 | Vadon et al. .................. 382/113 |
| 2008/0232680 | A1 * | 9/2008 | Berestov et al. .............. 382/154 |

FOREIGN PATENT DOCUMENTS

EP          0 037 530       10/1981

* cited by examiner

*Primary Examiner* — Mike Rahmjoo
(74) *Attorney, Agent, or Firm* — Blakely, Sokoloff, Taylor & Zafman

(57) ABSTRACT

The invention relates to a method and system for the acquisition and correlation matching of points belonging to a stereoscopic pair of images, whereby the pair is formed by a first image and a second image representing a scene. According to the invention, the two images of the pair are acquired with a single acquisition instrument (30) comprising two sensors CCD (31, 32) in the optical focal plane. The matching of the acquired stereoscopic pair consists in determining, by means of correlation, the point in the second image that is homologous to a point in the first image. Said correlation is performed for a point from the first image using an optimally-sized correlation window. When the homologous point of a point from the first image has been determined, the position deviation between the point from the first image and the homologous point thereof is entered in a table. Once all of the homologous points of the points from the first image have been found, the results table is reset barycentrically. The points that do not meet a criterion are rejected, i.e. points suspected of having erroneous matching. The processing is performed at a dyadic resolution level.

21 Claims, 10 Drawing Sheets

FIG_1

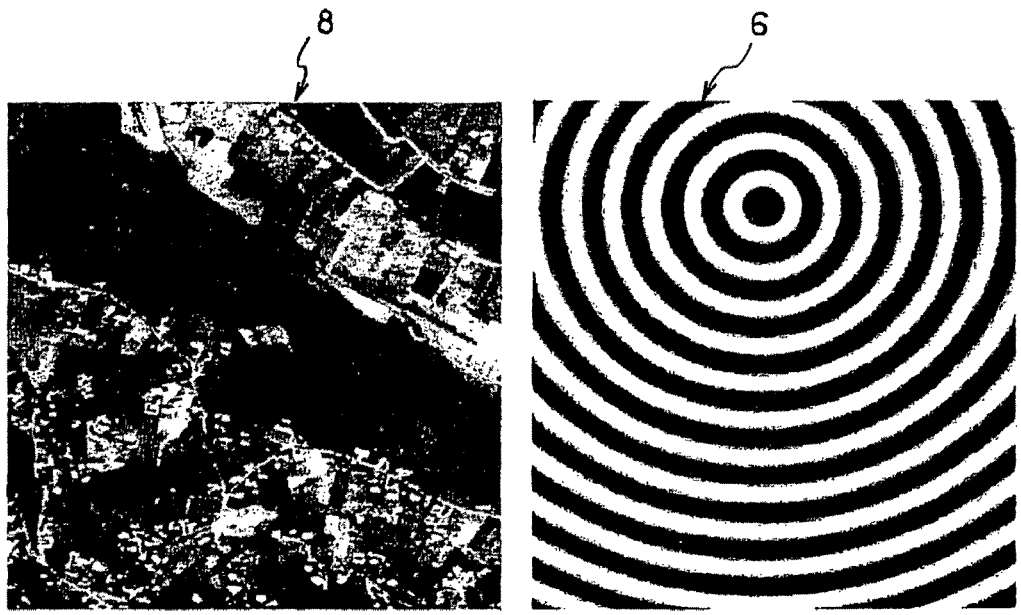
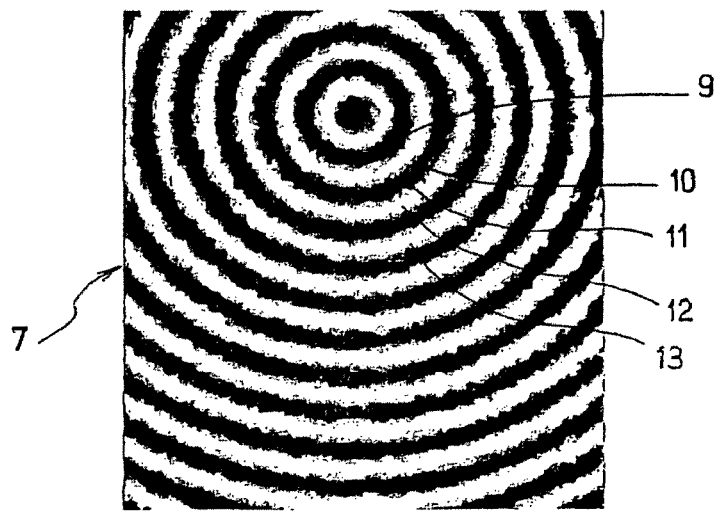
FIG.2

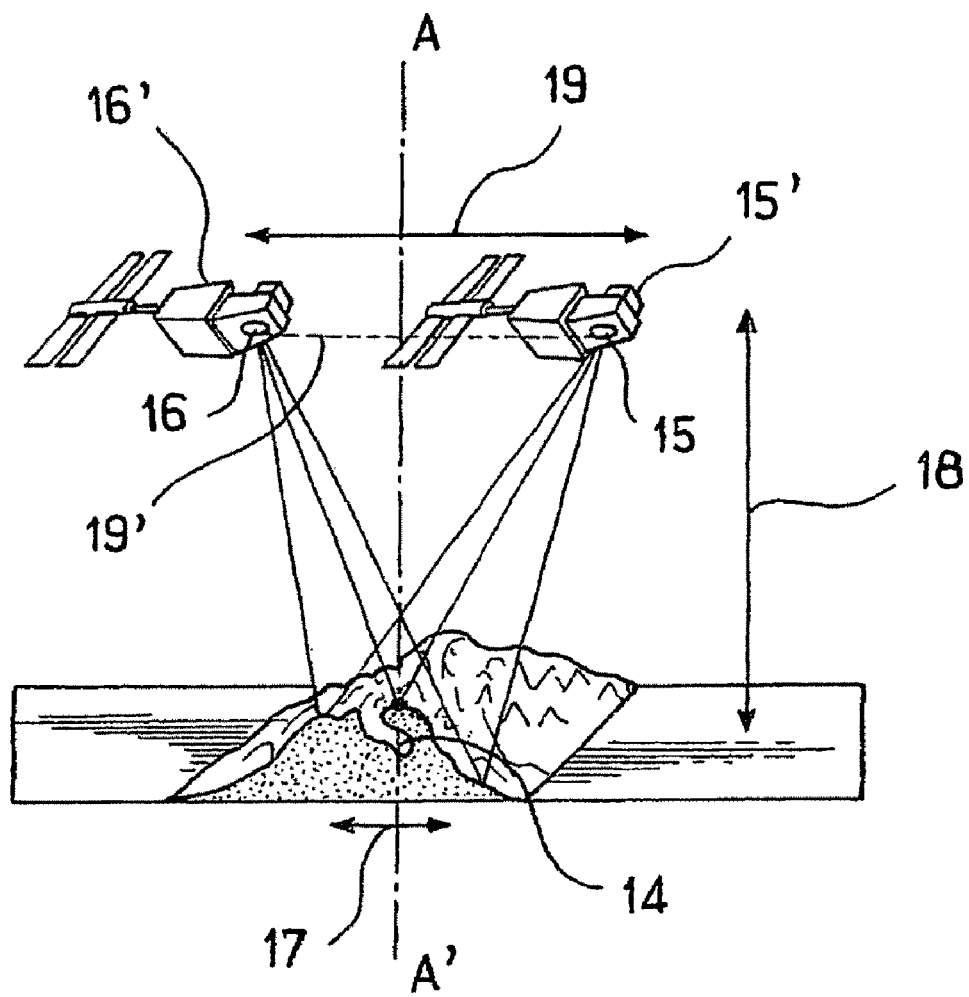
FIG_3

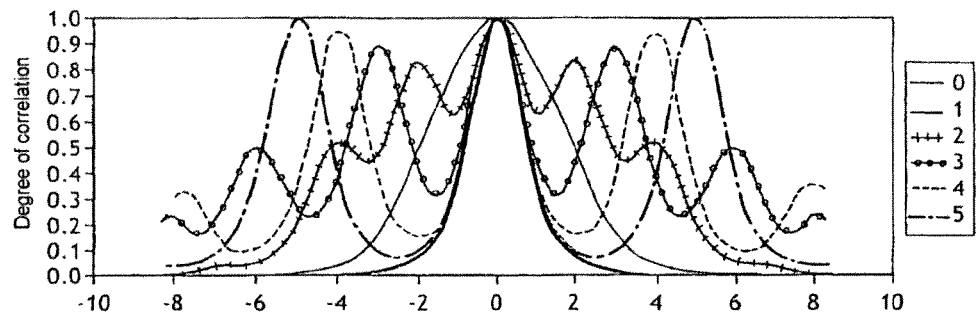
FIG_4
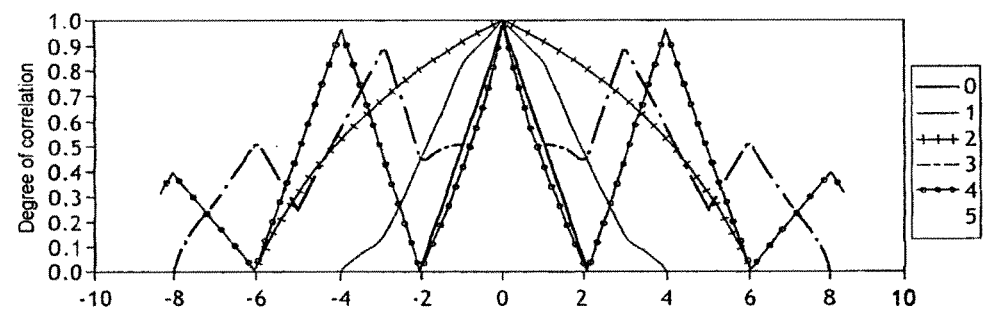
FIG_5
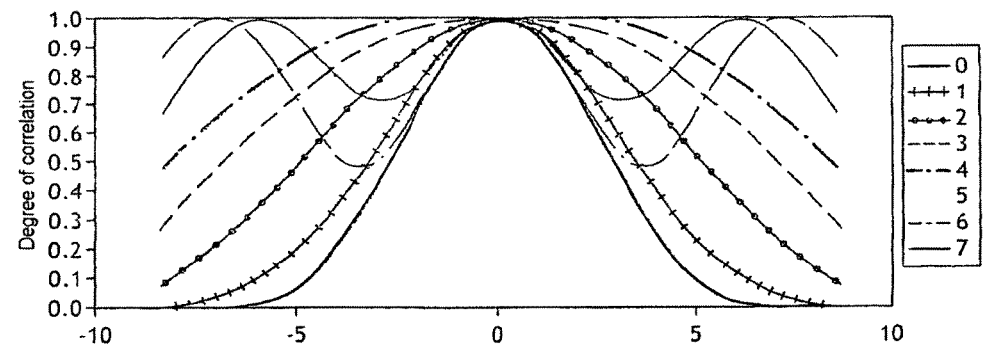
FIG_6

FIG_9

FIG_10

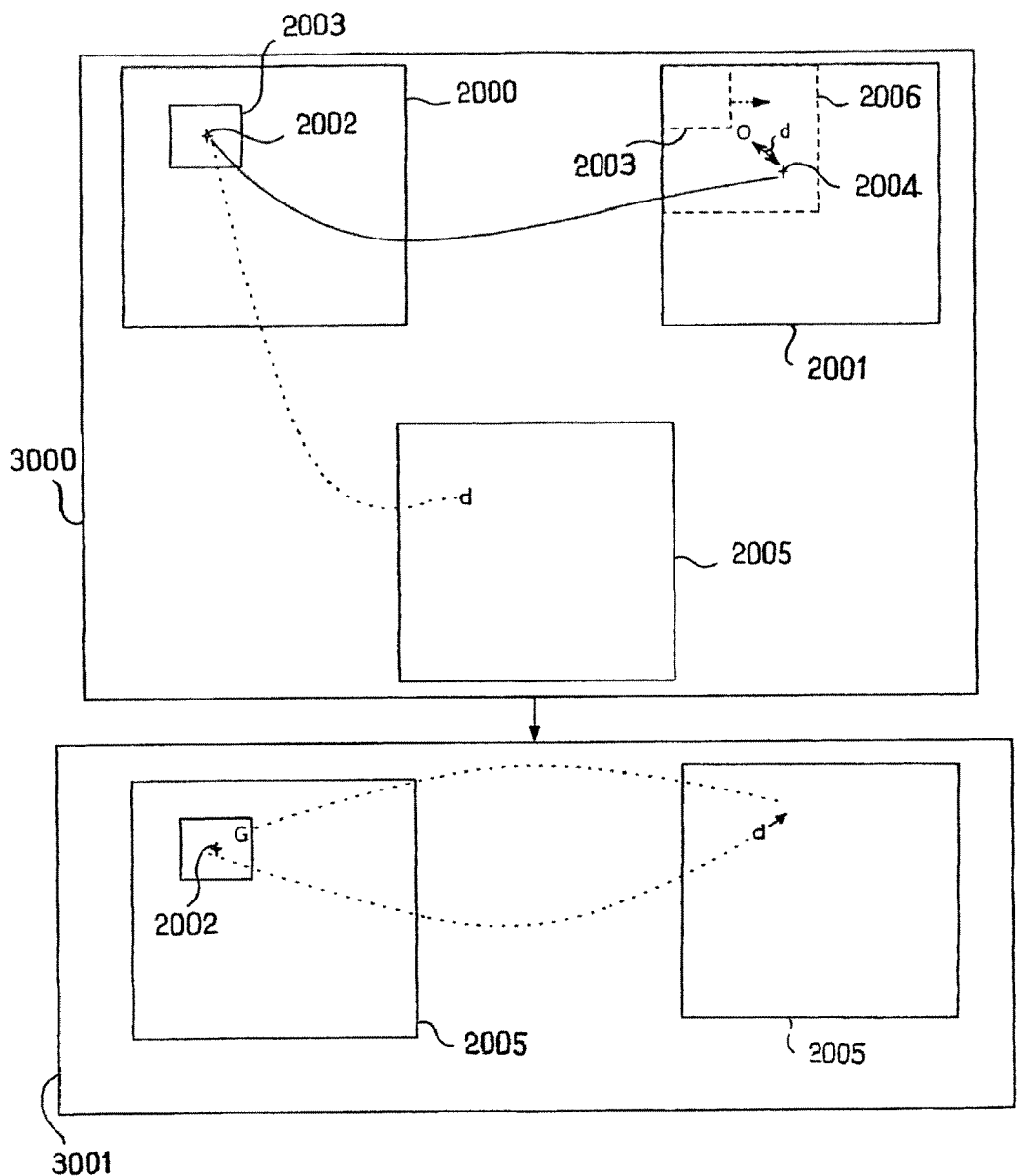
FIG_12

FINE STEREOSCOPIC IMAGE MATCHING AND DEDICATED INSTRUMENT HAVING A LOW STEREOSCOPIC COEFFICIENT

The present patent application is a continuation application of currently pending U.S. patent application Ser. No. 10/594,257 filed on Jun. 21, 2007, which is a non-provisional patent application of International Application No. PCT/FR2005/000752 filed on Mar. 29, 2005.

The present invention relates to the field of stereoscopy. In particular, the invention relates to a method and an assembly for the acquisition and fine matching of a stereoscopic pair of images or stereopair.

Thus, the invention relates to a method and to a system for acquisition and for bringing into correspondence the points in a first image with the points in a second image forming a stereopair.

GENERAL PRESENTATION OF THE PRIOR ART

Stereoscopy is a method giving the impression of relief from a pair of 2D (two-dimensional) images representing a scene that has been acquired from different viewpoints.

As illustrated in FIG. 3, two images forming a stereopair are acquired using two CCD (charge coupled device) sensors 15, 16 (in matrix or array form) that lie in the same focal plane 19' and are symmetrical with respect to the straight line A-A' passing through the center of the observed scene and perpendicular to the focal plane 19'.

These COD sensors allow two images of the observed scene located at a certain distance 18 from the CCD sensors to be acquired.

Owing to the separation 19 between the two CCD sensors that have acquired them, these two images are not unrelated. Thus, a scene will see its images shifted from one image of the stereopair to the other. This shift is called disparity.

The most sophisticated stereoscopic system at the present time is the human visual system. Man has two eyes located in the same focal plane, each comprising a lens (optical system) and a retina (CCD sensor). His eyes allow him to perceive his environment from two slightly different viewpoints. The mental merging of these two views allows him to generate a spatial (3D) image of his environment.

Stereopair processing methods try, by mathematical computation, to model what our brain does without any difficulty. The principle consists firstly in bringing the points of the images of the stereopair into correspondence. Secondly, the 3D coordinates of the points of the observed scene are reconstructed by computing the intersection of the straight lines passing through the matched points and through the optical centers of the CCD sensors.

The main difficulty encountered when employing such a method is how to properly bring the points in the images of the stereopair into one-to-one correspondence. This is because, since the two images of the stereopair are not taken at the same angle of incidence, a given point in the scene, the position of which in the first image is given by the coordinate (X1,Y1), will have coordinates (X2,Y2) in the second image, where XI≠X2 and Y1≠Y2.

This position difference between the projections onto the CCD sensors of a given point in the observed scene, the two images of which are formed on geometrically noncorresponding points, is called the geometric disparity. Hereafter, the term "position difference (or difference in position)" will be preferred to the term "disparity" although both have the same meaning.

A number of methods have already been proposed for matching the points of two images taken at two different angles. These methods often use the principle of correlation to bring the points of one image into correspondence with the other and therefore to determine the position differences.

The principle of correlation is based on measuring a local resemblance between two images. This local resemblance is measured by introducing weighted windows (or a matrix of coefficients) centered on neighborhoods that are homologous as regards geometrical positioning in the image. These weighted windows are called correlation windows.

As shown in FIG. 1, the method consists in applying a correlation window 3 centered on the point 40 under investigation in the first image 1 and in seeking its radiometrically homologous point 41 in the second image. This operation is carried out by displacement (in the second image) of the correlation window within a larger window, called the search area 4. The search area 4 is centered on the estimated geometrically homologous point 42 of the current point 40 in the first image. The table of correlation values obtained constitutes the correlation sheet. The position difference for which the correlation value is a maximum is then adopted.

When the matching of the points of a stereopair of images is performed by correlation, the first image serves as reference and it is endeavored to find, for each point in the first image, its radiometrically homologous point in the second image.

This operation is carried out in succession on a subset of the points in the first image or on all said points. That point in the first image under investigation at a given instant will hereafter be called the current point. Each point in the first image may be considered as a signal which it is endeavored to find in the second image by correlation. A point 40 in the first image and a point 41 in the second image are radiometrically homologous points if they correspond to the same point in the scene represented in the images of the stereopair.

Starting from two 2D images forming a stereopair, it is possible, once the points in the two images of the stereopair have been matched, to determine the Z coordinate of a point in the scene having coordinates (X1,Y1) in the first image and (X2,Y2) in the second image of the stereopair.

In the absence of any disturbance (for example microvibration), the precision on determining the third coordinate of a point in the scene, also known as the altimetric precision, is given approximately by:

$$dz = d\epsilon/(b/h),$$

where:
 d$\epsilon$ is the precision 17 in reproduction of the disparity;
 b/h is the stereoscopic coefficient where:
  b is the distance 19 between the two CCD sensors lying in the same focal plane; and
  h is the distance 18 between the CCD sensors and the observed scene.

Methods that use the principle of correlation for matching each point in the first image with its radiometrically homologous point in the second image do not allow good precision in reproducing the disparity (d$\epsilon$) to be obtained. This is because the major drawback of the correlation method is what is called an "adhesion" effect in the most singular zones of the images of the stereopair, such as for example the contours. The adhesion effect is caused in particular by the size of the correlation window used for matching the points in the stereopair.

This adhesion effect is demonstrated in FIG. 2 for an axisymmetric sinusoidal shift 6 of period 35 and amplitude ±0.5, the measure 7 of this shift 6 by correlation with a prolate-type correlation window of 15×15 size and the first image 9. The measure 7 of this shift by correlation reveals the major drawback of correlation at the contours 9, 10, 11, 12, 13 of the image 7.

Consequently, the use of the correlation principle to determine the differences in position between the points in a stereopair requires there to be a large stereoscopic coefficient (b/h) so as to linearly reduce the altimetric error, or error in determining the third coordinate Z of a point in the scene represented in the stereopair. Specifically, as illustrated by the above equation, the altimetric error is inversely proportional to the stereoscopic coefficient. Conversely, small stereoscopic coefficients linearly increase the altimetric error.

One of the objects of the present invention is to provide a method of matching a stereopair that does not have the drawbacks of the method described above, and thus implement a method allowing precise matching of the points of a stereopair for small stereoscopic coefficients.

The matching of the points of a stereopair is performed by generating disparity maps. The position of each point in the disparity map corresponds to the position of a point in the first image, and the value of each point in the disparity map represents the position difference between the point in the first image and its radiometrically homologous point in the second image. For example, the value of the point with coordinates (A,B) of the disparity map is representative of the position difference between the point with coordinates (A,B) in the first image and its radiometrically homologous point in the second image.

As mentioned above, stereopair matching methods based on the correlation principle provide precise matching of the points only for a large stereoscopic coefficient.

The stereoscopic coefficient (b/h) is the ratio of the separation 19 between the two CCD sensors 15, 16 lying in the same focal plane 19' (cf. FIG. 3) and the distance 18 between the observed scene and the CCD sensors.

Since the distance 18 between the observed scene and the COD sensors depends on the application, the separation 19 between the CCD sensors 15, 16 must be sufficient to have a large stereoscopic coefficient.

Stereopair acquisition and matching systems comprise an acquisition system and a processing system. These two systems are in general far apart and communicate via wire or wireless communication means.

The processing systems allow a stereopair to be matched. These systems employ stereopair matching methods. In the case of a processing system employing a method based on the correlation principle, it is therefore necessary to have a large stereoscopic coefficient for precise matching of the images of a stereopair.

Stereopair acquisition systems providing the processing systems with the images to be processed must therefore be designed in such a way that they meet this condition (large stereoscopic coefficient of the stereopair).

For a stereopair acquisition system in space, the distance 18 between the acquisition system and the observed scene is very large.

Consequently, the separation 19 between the CCD sensors of the acquisition system must be very large in order to have a large stereoscopic coefficient. The magnitude of this separation means that stereopair acquisition systems in space comprise two optical instruments 15', 16' (satellites) each having a CCD sensor 15, 16.

In spatial acquisition systems, the presence of two optical instruments 15', 16' each having a CCD sensor 15, 16 introduces greater complexity in the image matching operation and a greater cost in designing such spatial acquisition systems and in placing them in orbit.

In near vision (for example using cameras), the acquisition of stereoscopic images requires the presence of two optical systems in the acquisition system.

Another object of the present invention is to provide a stereopair acquisition and matching unit comprising a simplified acquisition system, for the acquisition of a stereopair with a small stereoscopic coefficient, and a processing system employing the stereopair matching method according to the present invention.

PRESENTATION OF THE INVENTION

The invention relates to a processing system for an assembly for the acquisition and matching of a stereopair of images which comprises an acquisition system for acquiring a stereopair of images with a stereoscopic coefficient of a few hundredths and the processing system for processing the stereopair acquired, the processing system comprising:
  means for processing the two images of the stereopair in at least one processing direction and at various levels of resolutions, from the coarsest to the finest, said processing means comprising means which, for each change of level of resolution, are adapted for:
    determining, at each point in the first image, an optimum correlation window,
    computing, by correlation with the determined correlation windows, the position differences between each point in the first image and its radiometrically homologous in the second image,
    obtaining, for the current level of resolution, a map of the disparities between each point in the first image and its radiometrically homologous in the second image, and
    carrying out a barycentric correction operation on the points on said map obtained; and
  means for obtaining, for the finest level of resolution, the map of the disparities between each point in the first image and its radiometrically homologous in the second image.

Preferred, but nonlimiting, aspects of the processing system according to the invention are the following:
  the means for processing the two images of the stereopair further include:
    means for convoluting the images of the stereopair via a convolution window; and
    means for performing a times-2 zoom on the images of the stereopair;
  the means for determining the optimum correlation window at each point in the first image comprise:
    means for computing a curvature of the first image for each correlation window size,
    means for computing a curvature of the noise image for each correlation window size, and
    means for computing, for each correlation window size, the ratio (SNRc) of the above curvatures;
  and means for choosing the smallest correlation window size such that said ratio is greater than an exhaustiveness parameter input by the user;
  the means for processing the two images further include means for performing an interpolation on the second image using a disparity map obtained for the preceding level of resolution;
  the means for processing the two images further include:
    means for rejecting the homologous points resulting from larger correlation windows and containing smaller correlation windows, means for rejecting the homologous points (40, 41) of radii of curvature that meet a rejection condition after extrapolation of the second image (2), means for iteratively adding, in the disparity map corresponding to the current level of resolution, missing position disparity points as a function of the existing position difference points, means for smoothing the disparity map corresponding to the current level of resolution via a convolution window; and means for constructing the disparity map computed for the current level of resolution from the disparity map computed for the preceding level of resolution so as to update said disparity map computed for the preceding level of resolution; and the processing system further includes means for rejecting the homologous points that meet a rejection condition, said means for rejecting the homologous points comprising:

means which, for the current point, are adapted for computing, in the first image, the curvatures of its two neighboring points along each processing direction, means which, for the current point, are adapted for computing the smaller difference of the curvatures of the four points associated with the current point in the first image, means which, for the current point, are adapted for computing, in the second image, its homologous point interpolated via the disparity map, means which, for the current point, are adapted for computing the difference between its curvature and that of the homologous point, and means which, for the current point, are adapted for rejecting the homologous point if this difference is greater than the smaller difference computed on the first image.

The invention also relates to a method for matching a stereopair with a stereoscopic coefficient of a few hundredths, the method comprising the following steps:

processing using means for processing the two images of the stereopair, along at least one processing direction and at various levels of resolutions from the coarsest to the finest, by, for each change of level of resolution:

determining, at each point in the first image, an optimum correlation window, computing, by correlation with the determined correlation windows, the position differences between each point in the first image and its radiometrically homologous in the second image, obtaining, for the current level of resolution, a map of the disparities between each point in the first image and its radiometrically homologous in the second image, and performing a barycentric correction operation on the points of said map obtained; and generation, for the finest level of resolution, of the map of the disparities between each point in the first image and its radiometrically homologous in the second image.

Preferred, but nonlimiting, aspects of the method according to the invention are the following:

the method further includes the step of:

acquisition of a stereopair of images using a single acquisition instrument designed to operate with stereoscopic coefficients of a few hundredths and comprising two CCD sensors in the optical focal plane, each sensor allowing the acquisition of one image of the stereopair;

the method includes a step consisting in processing, using processing means, the two images of the stereopair along an epipolar direction;

the method includes a step consisting in processing, using processing means, the two images of the stereopair along an epipolar direction and a direction orthogonal to the epipolar direction;

the method further includes a step in which a user inputs at least one exhaustiveness parameter corresponding to the choice of a correlation signal-to-noise ratio along each processing direction;

the method further includes the steps for acquisition of:
a noise image using each CCD sensor,
the type of correlation window,
an epipolar direction for each image of the stereopair for a mean stereoscopic coefficient, and
at least one value of the maximum position difference along each processing direction;

the method further includes a data preprocessing step consisting in:
computing a number of levels of resolution along each processing direction as a function of each value of the maximum position difference,
filtering the images of the stereopair of images by convolution via a convolution window,
filtering the noise image by convolution via said convolution window, and
interpolating the stereopair of images in an epipolar geometry;

the image processing step further includes the steps consisting in:
performing a convolution on the images of the stereopair via a convolution window, and
performing a times-2 zoom on the images of the stereopair.

the step of determining the optimum correlation window consists, for each point in the first image, in:
computing a curvature of the first image for each size of the correlation window,
computing a curvature of the noise image for each size of the correlation window, and
computing, for each size of the correlation window, the (SNRc) ratio of the preceding curvatures;

and in choosing the smallest correlation window size such that said ratio is greater than each exhaustiveness parameter input by the user;

the image processing step further includes a step consisting in performing an interpolation on the second image using a disparity map obtained for a preceding level of resolution.

the image processing step further includes the steps consisting in:
rejecting the homologous points resulting from larger correlation windows containing smaller correlation windows,
rejecting the homologous radius of curvature points meeting a rejection condition after interpolation of the second image,
iteratively adding, in the disparity map corresponding to the current level of resolution, missing position difference points as a function of the existing position difference points,
smoothing the disparity map corresponding to the current level of resolution via a convolution window, and
compiling the disparity map computed for the current level of resolution from the disparity map computed for the preceding level of resolution so as to update said disparity map computed for the preceding level of resolution, the step of rejecting the homologous points meeting a rejection condition consist, for the current point, in:
  computing, in the first image, the curvatures of its two neighboring points along each processing direction,
  computing the smaller difference of the curvatures of the four points associated with the current point in the first image,
  computing, in the second image, its homologous point interpolated via the disparity map,
  computing the difference between its curvature and that of the homologous point, and
  rejecting the homologous point if this difference is greater than the computed smaller difference on the first image;

the step of generating the disparity map for the finest level of resolution comprises the generation of:
  at least one table representative of the map of the disparities along each processing direction, and
  at least one table representative of a map of the correlation window sizes employed at any unrejected point in the first image, along each processing direction; and the convolution and correlation windows used are convolution and correlation windows of the prolate type.

The invention also relates to an assembly for the acquisition and matching of a stereopair of images, comprising a system for the acquisition of a stereopair of images and a system for processing the stereopair acquired, in which the system for acquisition of the stereopair comprises a single acquisition instrument comprising two CCD sensors in the optical focal plane, each CCD sensor allowing the acquisition of one image, the acquisition system being designed to operate with stereoscopic coefficients of a few hundredths and the processing system comprises:
  means for processing the two images of the stereopair in at least one processing direction and at various levels of resolutions, from the coarsest to the finest, said processing means comprising means which, for each change of level of resolution, are adapted for:
    determining, at each point in the first image, an optimum correlation window,
    computing, by correlation with the determined correlation windows, the position differences between each point in the first image and its radiometrically homologous in the second image,
    obtaining, for the current level of resolution, a map of the disparities between each point in the first image and its radiometrically homologous in the second image, and
    carrying out a barycentric correction operation on the points on said map obtained; and
  means for obtaining, for the finest level of resolution, the map of the disparities between each point in the first image and its radiometrically homologous in the second image.

The invention also relates to an acquisition system for an assembly for the acquisition and matching of a stereopair of images, comprising the system for acquisition of a stereopair of images and a system for processing the stereopair acquired, the stereopair acquisition system comprising a single acquisition instrument comprising two CCD sensors in the optical focal plane, each CCD sensor allowing acquisition of one image of a stereopair of images, the acquisition system being designed to operate with stereoscopic coefficients of a few hundredths.

PRESENTATION OF THE FIGURES

Other features and advantages of the invention will become clearer from the following description, which is purely illustrative and nonlimiting, and must be read in conjunction with the appended drawings in which:

FIG. 2 illustrates a view of a scene of the column component of an injected sinusoidal offset, and the result of the measurement of this offset by correlation;

FIG. 3 illustrates a perspective view of a stereoscopic system;

FIG. 4 illustrates a graph showing the degree of correlation along one direction of a SPOT5-type image as a function of the position difference between the current point in the first image and the current point in the second image, the current point corresponding in each image to the correlated point or the point at the center of the SPOT5 window (cf. page 23);

FIG. 5 illustrates a graph showing the degree of correlation of a window of the 2×2 square hypomode type as a function of the position difference between the current point in the first image and the current point in the second image, the current point corresponding in each image to the correlated point or to the point at the center of the window;

FIG. 6 illustrates a graph showing the degree of correlation of a prolate-type window as a function of the position difference between the current point in the first image and the current point in the second image, the current point corresponding in each image to the correlated point or to the point at the center of the window;

FIG. 12 illustrates correlation and barycentric correction steps of the image matching method.

DESCRIPTION OF ONE EMBODIMENT OF THE INVENTION

The present invention will now be explained in detail with reference to FIGS. 1 to 12. The equivalent elements shown in the various figures will bear the same numerical references.

The method presented here makes it possible to compute precise maps of the disparities between stereopairs having small stereoscopic coefficients with the same altimetric precision as for large stereoscopic coefficients. This method operates down to very low stereoscopic coefficients (0.01) without degrading the altimetric precision.

For the purpose of the present invention, the term "small stereoscopic coefficient" is understood to mean a stereoscopic coefficient of a few hundredths, more precisely a stereoscopic coefficient of less than 0.1 and even more precisely between 0.1 and 0.01 (i.e. lying between a tenth and a hundredth).

To acquire and match a stereopair with a low stereoscopic coefficient, an acquisition and matching unit will be presented that comprises an acquisition system for acquisition of a stereopair with a low stereoscopic coefficient and a processing system for processing the stereopair acquired.

The acquisition of a stereopair with a low stereoscopic coefficient (low b/h) has the advantage of limiting the hidden parts, that is to say parts appearing only in one of the two images, and for example seeing the streets in an urban environment comprising skyscrapers. This is because, as illustrated in FIG. 3, the concealed parts 14 are connected with the acquisition by one CCD sensor, 15 or 16, of an oblique picture 2D of a 3D object. Thus, the acquisition with a low stereoscopic coefficient allows more automatic implementation in producing the maps of the disparities between stereopairs by avoiding the ever laborious management of the hidden parts.

The various steps that have led to determining the method and the system will now be presented.

The models used in the image processing are discrete models. However, it is often easier to start by reasoning based on a continuous model and then to go on to the discrete case. It is this approach that is used below in order to describe the image matching method.

1. Continuous Unidirectional Correlation Modeling

Determination of the continuous model of the unidirectional correlation will result in the generation of an equation for linking the measurement of the position difference performed by the correlation operation along a processing direction as a function of the actual value of the position difference. This equation will demonstrate the abovementioned drawback of the "adhesion" correlation. An example of processing that allows this adhesion effect to be limited will then be presented. Finally, a second relationship, namely a local directional morphological condition, on which the precision of the measured position difference depends, will also be obtained from the continuous modeling of the unidirectional correlation.

Figure 10:
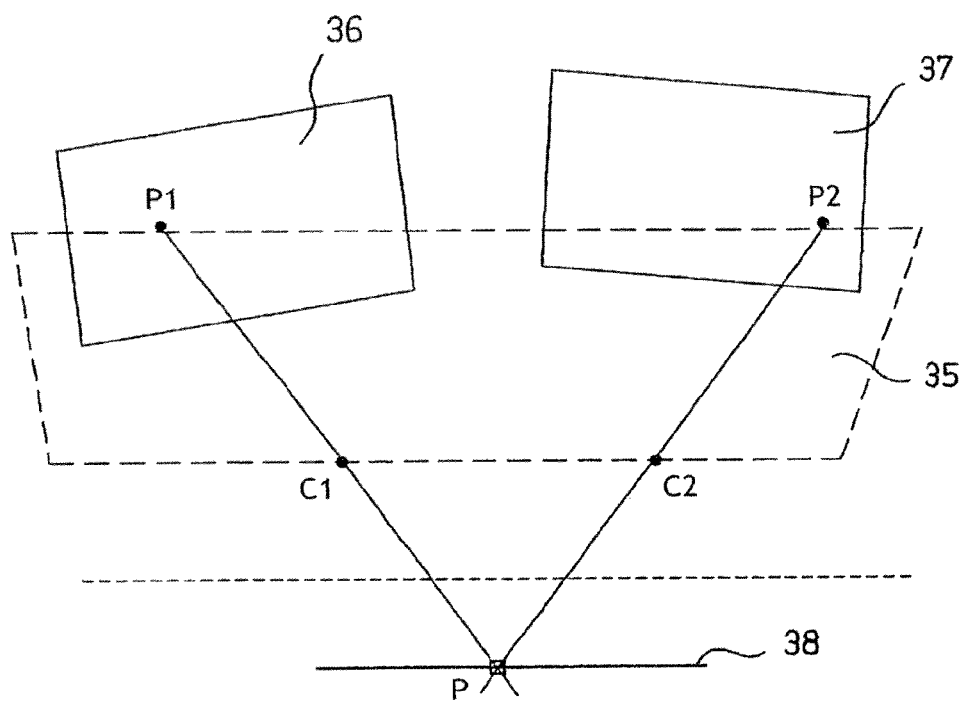
FIG. 10 illustrates a perspective view of two images forming a stereopair and of the observed scene.

In this part, the assumption is made that there is a unique direction in the disparity maps, for example along what are called epipolar straight lines, a definition of which will now be given. As illustrated in FIG. 10, in a stereopair, the set of epipolar planes is defined as being the set of planes passing through the two optical centers C1 and C2.

The points P, P1 and P2 form part of the scene 38, the first image 36 and the second image 37 of the stereopair, respectively. It may be seen that, for all the points in the scene 38, the point P and its image points P1 and P2 lie in one and the same epipolar plane 35. The lines corresponding to the intersection of the image planes 36 and 37 with the epipolar plane 35 are the epipolar lines. These are known since the positions of the CCD sensors C1 and C2 are known.

The continuous formulation of the nonlinear correlation coefficient is performed in the case of a stereopair of images with a low level of noise. The correlation coefficient along the direction of unit vector $\vec{v}$ in a neighborhood centered on $\{t\}$ is:

$$\rho_t(\Delta t) = \frac{\int \varphi_t(x) \cdot I(x) \cdot \tilde{I}(x+\Delta t) dx}{\sqrt{\int \varphi_t(x) I^2(x) dx \int \varphi_t(x) \tilde{I}^2(x+\Delta t) dx}} = \frac{(\varphi_t \cdot I) \cdot \tilde{I}(\Delta t)}{\|I\|_{\varphi_t} \|\tilde{I}(\Delta t)\|_{\varphi_t}}$$

(· is the correlation operator, I is the reference image, $\tilde{I}$ is the image to be matched and $\phi$ is the window).

The aim is to find the vector position difference $\Delta t$ that maximizes this correlation coefficient. This is because the position difference for which the correlation is a maximum corresponds to the position difference between the coordinates of a point in the first image and the coordinates of its radiometrically homologous point in the second image.

Let u(t) be the vector function which at any point t in the image associates $\Delta t$. This correlation coefficient is computed from a ratio—it is therefore nonlinear. Since the position differences are differences in relative local positions, the search for the position difference that maximizes the correlation coefficient may be reduced to a search about the point $t_0=0$.

Thus:

$$\rho_0(u_0) = \frac{\int \varphi \cdot I \cdot \tilde{I}(x+u_0) dx}{\sqrt{\int \varphi \cdot I^2(x) dx \int \varphi \cdot \tilde{I}^2(x+u_0) dx}}$$

where $\|I\|_{\phi 0}$ is a constant and $u_0=u(0)=\Delta t$, I is the reference image, $\tilde{I}$ is the image to be matched and $\phi$ is the window.

The objective is to find $u_0$ such that this correlation coefficient is a maximum. The formula $\tilde{I}(x)=I(x+\vec{\epsilon}(x))$ makes it possible to pass from one image of the stereopair to the other via a "small" pixel displacement (the term "small" will be given a particular meaning below). A pixel is the smallest element of an image which can be individually assigned a gray level representative of an intensity.

Performing an expansion limited to the second order, along the direction of the unit vector $\vec{v}$ centered on $\{0\}$ and, after $\tilde{I}$ has been replaced by its approximate value as a function of I, the correlation coefficient becomes:

$$\rho_v(u_O) = 1 - \frac{\varphi_0 * [I'(x) \cdot (\varepsilon_v(x) + u_0)]^2}{2\|I\|_{\varphi_0}^2} + \frac{\varphi_0 * [I(x)I'(x) \cdot (\varepsilon(x) + u_0)]^2}{2\|I\|_{\varphi_0}^4}$$

where I' is the derivative of I along $\vec{v}$.

Equation Linking the Measured Value of the Position Difference to its Actual Value The search for the above maximum correlation coefficient amounts to seeking to make the derivative of this correlation coefficient zero in any processing direction.

Let u be the measured value of the position difference along the direction $\vec{v}$ at the point t corresponding to the maximum correlation coefficient ($\rho'=0$) and let $\epsilon$ be the actual position difference along the same direction.

The fundamental equation of the nonlinear correlation is then:

$$u \cdot C = \phi * [\epsilon \cdot d(I, I')]$$

where $C=-\phi*d$ is the correlation curvature along the direction $\vec{v}$, where $\phi$ is the correlation window and $$d(I, I') = \frac{I'^2 - I'' A(t)}{\|I\|_{\varphi_t}^2}$$

is the correlation quasi-density and $$A(t) = \frac{[\varphi * II']}{\|I\|^2_{\varphi_t}}.$$

It depends only on the reference image I and on its derivative.

All the derivatives are expressed along the processing direction $\vec{v}$.

This fundamental correlation equation makes it possible to link the position difference measured by the correlation operation to the actual value of the position difference, and to do so without passing via the explicit computation of the correlation—this computation is always very costly in terms of time.

It should be noted, by examining the formula for obtaining the correlation quasi-density, that the latter is principally a function of I'². This correlation quasi-density is therefore very sensitive to the contours, and more generally to the singularities (i.e. points where certain quantities become infinite). To alleviate the abovementioned adhesion problem, a method referred to as a barycentric correction is used, allowing the true position difference to be obtained. This method will now be described.

Barycentric Correction Method

The barycentric correction method is based on the following observation. The fundamental equation at a coordinate point, for example 0, becomes, if the image has a quasi-density concentrated at $\{x_0'\}$, $$\epsilon(x_0') \approx -u(0)$$

This means that the measurement at the point 0 is equal to the true position difference at the point $\{x_0'\}$ (to within the sign). This is precisely the abovementioned adhesion effect.

The image adhesion effect assigns to the current point the true position difference resulting predominantly from another more singular point.

The barycentric correction method will therefore consist in seeking the "most singular" position in the correlation window used at the current point and in assigning to this position the most singular value of the position difference measured at the current point.

The correlation window $\phi$ is positive and positioned at 0. The barycenter on the support of $\phi$, the quasi-density of which is $\phi(x)d(x)$, is sought.
The position is thus:

$$\overrightarrow{OG} = \frac{\int \overrightarrow{OP}(x)\varphi(x)d(x)dx}{\int \varphi(x)d(x)dx}$$

where the vector $\overrightarrow{OP}$ describes the support of $\phi$. If the mass is concentrated around the center of gravity, then the integral is restricted to the neighborhood of the center of gravity $V(\overrightarrow{OG})$. In addition, the position difference may be considered to be constant in this small neighborhood. Hence:

$$\int \varepsilon(x)\varphi(x)d(x)dx \approx \int_{V(G)} \varepsilon(x)\varphi(x)d(x)dx \approx \varepsilon(x)C.$$

Therefore:

$$\epsilon(\overrightarrow{OG}) \approx -u(0).$$

All the terms in the above equation are known and therefore can be computed. It is sufficient to assign the measured value of the shift u(0) to the coordinate point G.

An equation for linking the position difference measured by the correlation operation to the actual value of the position difference and also a processing operation for mitigating the correlation adhesion problem have therefore been presented. As indicated in the presentation of the model, a second equation, namely a local directional morphological condition, will now be determined.

Local Directional Morphological Condition

By searching for the maximum correlation area it is possible to find, from a point in the first image, its radiometrically homologous point in the second image.

This search for the maximum means that the second derivative of the correlation coefficient is strictly negative, so that there are not several maxima at the correlation surface. This is because the presence of several maxima in the correlation sheet would make the determination of the homologous point ambiguous.

The expression for this second derivative along the direction $\vec{v}$ is called the morphological equation:

$$\rho''=C,$$

where $\rho''=C$ is called the correlation curvature along the direction $\vec{v}$. The curvature must be sufficient—a quantitative expression as a function of the noise will now be given to determine "sufficient".

Assuming that the nature of the noise is known, for example Gaussian noise of standard deviation $\sigma$ and that this noise has been normalized by a Gaussian g (typical standard deviation of 0.5 quantization step), then:

$$\overline{C}_b = \frac{-2\sigma^2 \|g'\| \mu(\varphi)}{\|I\|^2_\varphi},$$

where $\mu(\phi)$ is the integral of $\phi$.

The correlation curvature signal-to-noise ratio is then defined by:

$$SNR_C = \left|\frac{C}{\overline{C}_b}\right|$$

which is independent of the image.

The correlation condition is: $SNR_C$ greater than the threshold preferably of the order of 10 (one order of magnitude), which makes it possible to choose the points adopted. If this condition is met, the noise can be neglected when computing the fundamental and morphological equations, and the model established earlier is applicable.

A morphological condition therefore has been established. This morphological condition does not depend on the position difference. This is a result of not inconsiderably practical importance. This is because it is possible to verify at any point in the image that this condition is met, and to do so without recourse to laborious computation of the correlation itself. This result justifies a posteriori the choice of weighted correlation coefficient.

The continuous modeling of the unidirectional nonlinear correlation has therefore been made. There remains to go onto the discrete case since an image is a sequence of points, and consequently a discrete model.

2. Discrete Modeling of the Unidirectional Nonlinear Correlation

Fine modeling of the computation of the discrete correlation coefficient results, as will be presented here, in:
performing a 2-times zoom on the stereopair;
choosing a type of function as correlation window; and
interpolating the input images and the correlation sheet with a sinc (cardinal sine) filter.

Finally, an iteration stop test for a processing direction and a multiple level of resolution computation, called a multiscale computation, will be carried out.

Sampling

After having effected a high-quality sampling, that is to say S=R, where S is the spectral support of the image and R is the reciprocal cell corresponding to the sampling, the correlation coefficient between the digitized images of a stereopair is computed. This computation requires II' and I'$^2$, which "live" spectrally in R+R, which will be simply called 2R, to be properly expressed. The computation of the correlation coefficient $$\rho_0(u_0) = \frac{(\varphi_0 \cdot I) \cdot \tilde{I}(u_0)}{\|I\|_{\varphi_0} \sqrt{\varphi * \tilde{I}^2(u_0)}}$$

from its numerator and from its denominator requires good sampling of the squared image.

A preferred solution for computing the correlation coefficient is to compute the numerator and denominator separately, and then to compute the quotient therefrom. This is because the direct computation involves squared derivatives, for example in the expression involving I'(x)$^2$ (cf. the fundamental equation).

Of course, these two computations apparently require only the one same spectral support 2S. The direct computation is carried out on much higher frequency computation is performed on much higher frequency (HF) terms (terms in I'$^2$) than that where the denominator and the numerator (terms only in I$^2$) are computed separately before forming the quotient therefrom. In addition, the computation of the denominator involves a square of the image.

To satisfy the sampling conditions described above, a two-times zoom on the images of the stereopair is performed. This zoom consists, for each of the images of the stereopair, in doubling the number of row points by inserting a point of unknown value between two points of known value in the image, in doubling the number of column points, by inserting a point of unknown value between two points of known value in the image, and in determining the unknown values by interpolation using the known values. Specifically, the interpolation on the two-times zoom is an estimation of intermediate values in a series of known values. The interpolation on the two-times zoom of the images must be precise.

Preferably, the method uses long separable interpolation filters of the sinc type for the various interpolations. The size of image interpolation sinc filter for performing a zoom will preferably be a size 35 filter. A sinc filter will also be used for performing the interpolations on the correlation sheet. It will be preferable to use a size 11 sinc filter for the interpolations on the correlation sheet during the subpixel search for the correlation maximum.

Once the two-times zoom has been performed, the correlation coefficient between the digitized images of the stereopair is computed. As described above, a correlation window 3 is needed to compute the correlation coefficient between the two images of the pair. The correlation windows may be of various types. However, certain window types minimize the impact of the error on the position difference measurement. The analysis that has led to the determination of a preferred type of correlation window will now be presented.

Determination of a Preferred Type of Correlation Window

In the vicinity of the maximum, the correlation sheet must be convex so as to ensure convergence of the algorithm for searching for the principal maximum since, if the correlation sheet is not convex, this means that several points in the second image of the stereopair may potentially correspond to the current point in the first image.

Now, only one of these points is the correct point, that is to say the true point radiometrically homologous to the current point in the first image. For a known impulse response image, the neighborhood of maximum size ensuring this sheet maximum convexity property will therefore now be sought.

The finest element that can be found in an image is equal to the impulse response. Consequently, it is sufficient to numerically study the shape of the correlation sheet for a pair of identical images reduced to three impulse responses separated by a distance of length Δl belonging to the [0;7] pixel interval, and to seek the maximum distance between the two impulse responses while maintaining a convex correlation sheet. This value then corresponds to the maximum possible exploration and gives meaning to the concept of "small" position difference used in the introduction of the image model.

Figure 11:
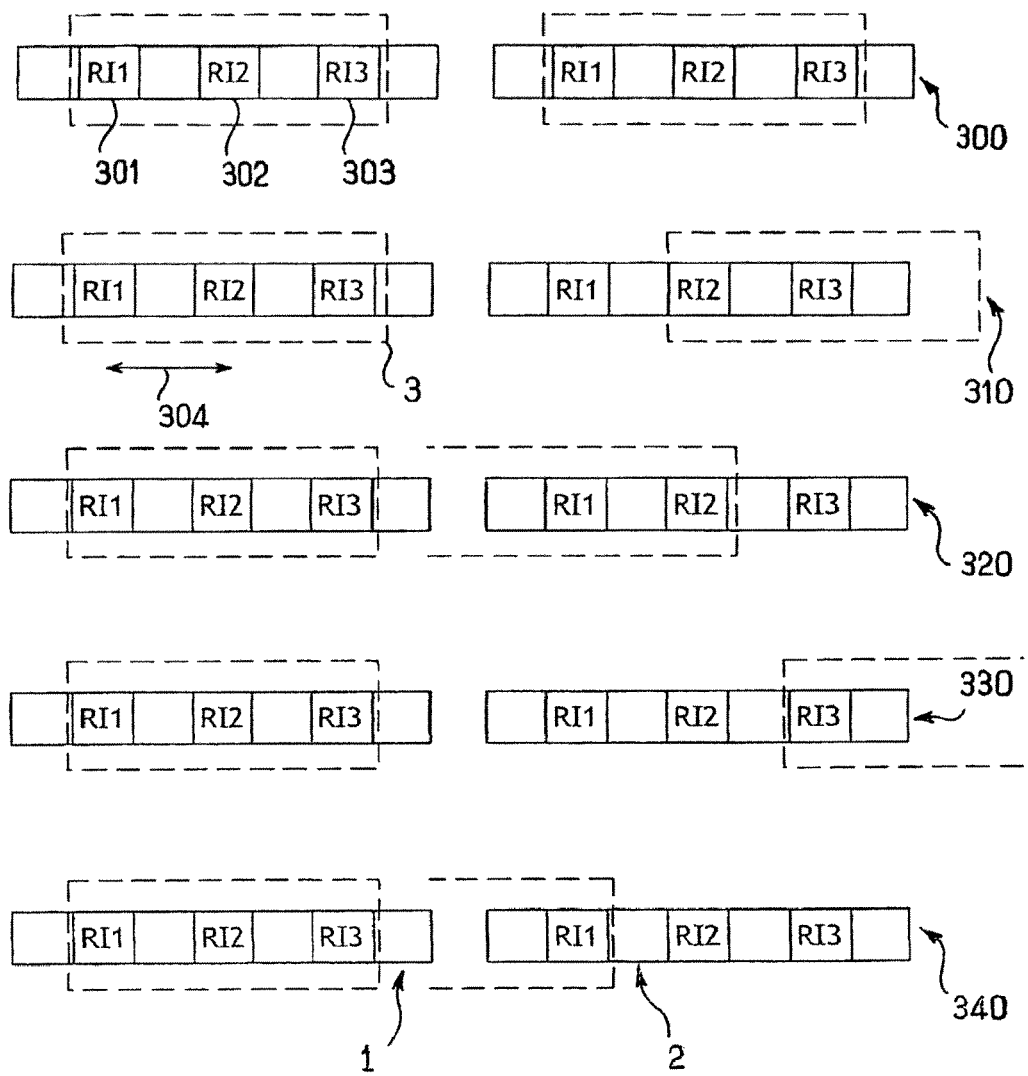
FIG. 11 illustrates a view of a pair of images each having three impulse responses or modulation transfer functions (MTFs)

The 1D analysis is sufficient in the case of separable impulse responses. To carry out the 1D analysis, two identical images 1,2 having impulse responses 301, 302, 303 separated by distances Δl 304, as illustrated in FIG. 11, are taken. The fact of taking two identical images in order to form the stereopair means that the points in the second image that are geometrically and radiometrically homologous to a point in the first image are coincident. The correlation window 3 is then slid along the analysis direction, along the second image 2.

For each displacement of 1 point in the correlation window 3, the correlation is computed. The graphs shown in FIGS. 4, 5 and 6 showing the degree of correlation between the two identical images as a function of the position of the correlation window 3 on the second image are obtained.

The abscissa x=0 corresponds to the case 300 in which the correlation window is placed on the point geometrically homologous to the current point in the first image, that is to say the correlation coefficient is measured between a point in the first image and its true radiometrically homologous point in the second image.

The abscissa x=1 corresponds to the case in which the correlation window is shifted in the second image by 1 point relative to the position of the true radiometrically homologous point.

The abscissa x=2 corresponds to the case 310 in which the correlation window is shifted in the second image by 2 points relative to the position of the true radiometrically homologous point, and so on.

The results of the correlation are given in FIGS. 4, 5 and 6 for the following cases: SPOT5 THR (FIG. 4); standard hypomode (clustering by 2×2 packet of pixels while maintaining the same sampling) (FIG. 5); and prolate (FIG. 6). These figures are graphs. The functions plotted in these graphs represent the correlation sheets.

As may be seen in FIG. 4, with a correlation window of the SPOT5 type, the maximum position difference between two impulse responses in order to maintain a convex sheet (i.e. one having a single maximum) is one pixel. It is therefore necessary to have an exploration area that does not exceed one pixel. This is because, for the distance $\Delta l=1$, a correlation sheet is convex. However, for the distance $\Delta l=2$, the correlation sheet has several maxima.

As illustrated in FIG. 11, these maxima correspond to the case 300 in which the correlation window 3 is placed over the true point radiometrically homologous to the current point in the first image, and to other cases in which the correlation window is shifted relative to the true radiometrically homologous point.

It may be seen that there are four secondary maxima for x=2, x=−2, x=4 and x=−4. The case 310 is obtained for x=2, that is to say when the correlation window is shifted relative to the true homologous point in the second image 2. This is a two-point shift along the processing direction.

The case 320 is obtained for x=−2, that is to say when, in the second image, there is a two-point shift of the correlation window relative to the true homologous point in the opposite direction to the processing direction. The cases 320 and 330 are obtained for x=4 and x=−4.

For these four cases 310, 320, 330 and 340, the correlation sheet has four maxima. The correlation sheet therefore gives us five points homologous to the current point in the first image. Now, only one of these measured homologous points is the true point homologous to the current point in the first image. This is the reason why it is necessary to ensure that the correlation sheet is convex. With a window of the SPOT5 type, the maximum position difference for maintaining a convex correlation sheet is therefore 1 pixel.

As may be seen in FIG. 5, the standard hypomode allows exploration over 2 pixels. This means that the maximum position difference that can be observed between two homologous points is two pixels.

As may be seen in FIG. 6, the prolate function allows exploration over 4 pixels.

The prolate solution ensures the best enlarged convexity of the correlation sheet and strong continuity properties over the position difference measurement. The prolate function possesses the property of being the positive function whose supports are the most concentrated simultaneously in space and in frequency. A preferred method will therefore use a prolate function as correlation function.

It has just been demonstrated that certain window types minimize the impact of the error on the position difference measurement. This measurement precision search means preferably opting for a correlation window equal to the prolate function (the reader will have understood that it is possible to opt for another type of correlation window, such as a correlation window of the hypomode or SPOT5 type, or any other type of correlation window known to those skilled in the art). Moreover, the adhesion effect is smaller for windows of smaller spatial support (i.e. of reduced size). To minimize the adhesion effect, a prolate function will be used that has the smallest possible size compatible with the conditions for applying the fine correlation model described above and recalled below.

Determination of an Optimum Size of Correlation Window at Each Point

A morphological threshold $SNR_C$ associated with the precision of the correlation was defined above. It was also mentioned that the fundamental equation is impossible to solve. This means searching for windows of the smallest possible size (or dimension) compatible with this $SNR_C$ threshold.

This approach means searching for the prolate of weakest spatial support, that is to say of largest spectral support, which meets the morphological condition in the processing direction. An adaptation of the window at any point in order to better meet the fundamental morphological equation will now be proposed:

let the series of prolate functions $\{P_n\}$ be associated with the series of decreasing circular spectral supports $\{(\phi_n)\}$;

let $\phi_0$, equal to C, be the circle inscribed in 2R of largest possible spectral support on the two-times zoom.

The search for the optimum window then amounts to finding, at any point, the prolate correlation window of maximum circular spectral support that belongs to the series $\{P_n\}$ and meets the morphological condition. This is achieved simply by successive trials with prolate functions of decreasing spectral support.

The reader will have understood that a window of maximum spectral support is a window of minimum spatial support. Consequently, the aim is to find the prolate correlation window of smallest size (spatial support) that meets the morphological condition described above.

Multiscale Processing

The exploration boundary imposed by the type of correlation window on the one hand, and by the search at any point for the smallest window size on the other, does not allow the radiometrically homologous points of a stereopair to be determined when the position difference between the points is large.

This result means that multiscale (multiple levels of resolution) processing has to be envisaged, as this makes it possible, by varying the resolution of the image, to preserve the sheet convexity conditions irrespective of the amplitude of the desired position difference. A variation in the resolution is a variation in the definition of the pixel.

For example, if an image is displayed on a screen measuring 21 cm along a row by 18 cm along a column, and if this image has 210 pixels along a row and 180 pixels along a column, then this image has a level of resolution of 10 pixels per centimeter. A reduction in level of resolution (by passing from a fine level of resolution to a coarser level of resolution) will correspond to a reduction in the number of pixels along a row and along a column for displaying the image. For a reduction factor of 10 in the level of resolution, there will now be only 21 pixels along a row and 18 along a column, i.e. a level of resolution of one pixel per centimeter.

The dyadic multiscale (multiple levels of resolution) approach is necessary in order to meet the correlation sheet convexity condition irrespective of the amplitude of the position differences. The pair of images is degraded in terms of resolution (i.e. the level of resolution is reduced) through a convolution by a spectral support prolate with a radius $r_{C/s}$, where "$r_C$" is the radius corresponding to the image zoomed by a factor of 2 and "s" is the current level of resolution.

Lowering the level of resolution requires the holes to be plugged, that is to say requires the value of the points in the disparity map that are of unknown value to be estimated. A point of unknown value is a point in the disparity map whose value is unknown. The holes are plugged iteratively by convolution with a circular prolate function, for example of radius 7. At each iteration, the missing points are in turn assigned values. Thus, an exhaustive map of the disparities between the points in the first image and their radiometrically homologous points in the second image is computed. The iteration at each level of resolution consists, by successive interpolation, in geometrically correcting, using this map along one direction, for example the epipolar direction, the second image in order to make it more and more geometrically similar to the first image.

Furthermore, it is possible—if the epipolar case is not pure—to explore in succession the orthogonal (row and column) directions, to compute in succession the unidirectional position differences by correlation, and to perform the corresponding unidirectional interpolations. Knowledge of the maximum position differences along the rows and columns means a processing depth at potentially different levels of resolution along the rows and columns. The number of dyadic levels of resolution required is:

along a row: $s_r = \log_2(\max\_r)$;
along a column: $s_c = \log_2(\max\_c)$, where max_r and max_c are the maximum position differences along a row and along a column, respectively.

At each level of resolution, the operations of interpolating the second image, according to the computed successive unidirectional disparity maps, require the application of a formula for the composition of the disparity maps. After each iteration, the composition is carried out between the map of the disparities between the interpolated image and the first image and the disparity map that has allowed the interpolated image to be generated (i.e. the disparity map for the preceding iteration). The interpolation errors therefore do not build up through the iterations, as we are always in the case of composition of at most two disparities.

The disparity composed with barycentric correction after two iterations is expressed in the following manner (it being understood that the first is always regularized and without correlation holes):

let $\epsilon_1$ be the first map of the disparities between the image $\tilde{I}$ and the first image I, this function being continuous and regular;

let $\tilde{I}_1(n) = \tilde{I}(n + \epsilon_1(n - \xi_1))$ be the image $\tilde{I}$ corrected with respect to the disparities $\epsilon_1$ of barycenter $\xi_1$, where $u_1(n) \approx -\epsilon_1(n - \xi_1)$, and let $\tilde{I}_2(m) = \tilde{I}_1(m + \epsilon_2(m - \xi_2))$ be the image $\tilde{I}_1$ corrected with respect to the disparities $\epsilon_2$ of barycenter $\xi_2$, where $u_2(m) \approx -\epsilon_2(m - \xi_2)$ and where $u_1(n)$ and $u_2(m)$ are the barycentrically measured disparity measurements, then:

$$\tilde{I}_2(m) = \tilde{I}_1(m + \epsilon_2(m - \xi_2)) = \tilde{I}(m + \epsilon_2(m - \xi_2) + \epsilon_1(m + \epsilon_2(m - \xi_2) - \xi_1))$$

Criterion for Rejecting Wrongly Matched Points

Mention was made above of points of unknown value. A point of unknown value is a point in the first image whose matching with a point in the second image has been rejected (i.e. a point whose matching is assumed to be erroneous). The criterion for rejecting falsely correlated points consists in comparing, point by point, the correlation curvatures between the first image and the disparity-corrected second image (interpolated within the reference group).

A point is rejected at each level of resolution when the difference between the curvature values between the two images is greater than a certain value. This value is equal at most to the minimum difference at the four points associated with the current point in the first image (the points associated with the current point are the points neighboring the current point but are located above, below, to the right and to the left of the current point).

Finally, for each processing direction and for the level of resolution of the image, the points computed from a prolate function of one size containing a prolate function of smaller size are removed since the correlation at these points is necessarily of lower precision.

3. Bidirectional Fine Correlation Method

The unidirectional fine correlation method was explained above so as to make it easier to understand the model. The bidirectional fine correlation method will now be presented.

The images of the stereopair are resampled in epipolar geometry along the rows or columns by interpolation. The search for 2D disparity tables is made alternately along the rows and the columns. The major difficulty in reconstructing the disparity table is generally that along the epipolar direction.

The relief-induced position differences are in general very high-frequency differences, while those along the orthogonal direction are often induced by vibrations of the carrier, and are low-frequency differences. This allows larger processing windows to be used along the direction perpendicular to the epipolar lines. This difference will of course be managed by the choice of a larger signal-to-noise ratio along the direction orthogonal to the epipolar lines than along the epipolar direction.

The unidirectional fundamental condition if $\vec{v}$ is the epipolar direction is the single relationship:

$$C_c / \tilde{C}_b > SNR_C.$$

Figure 1:
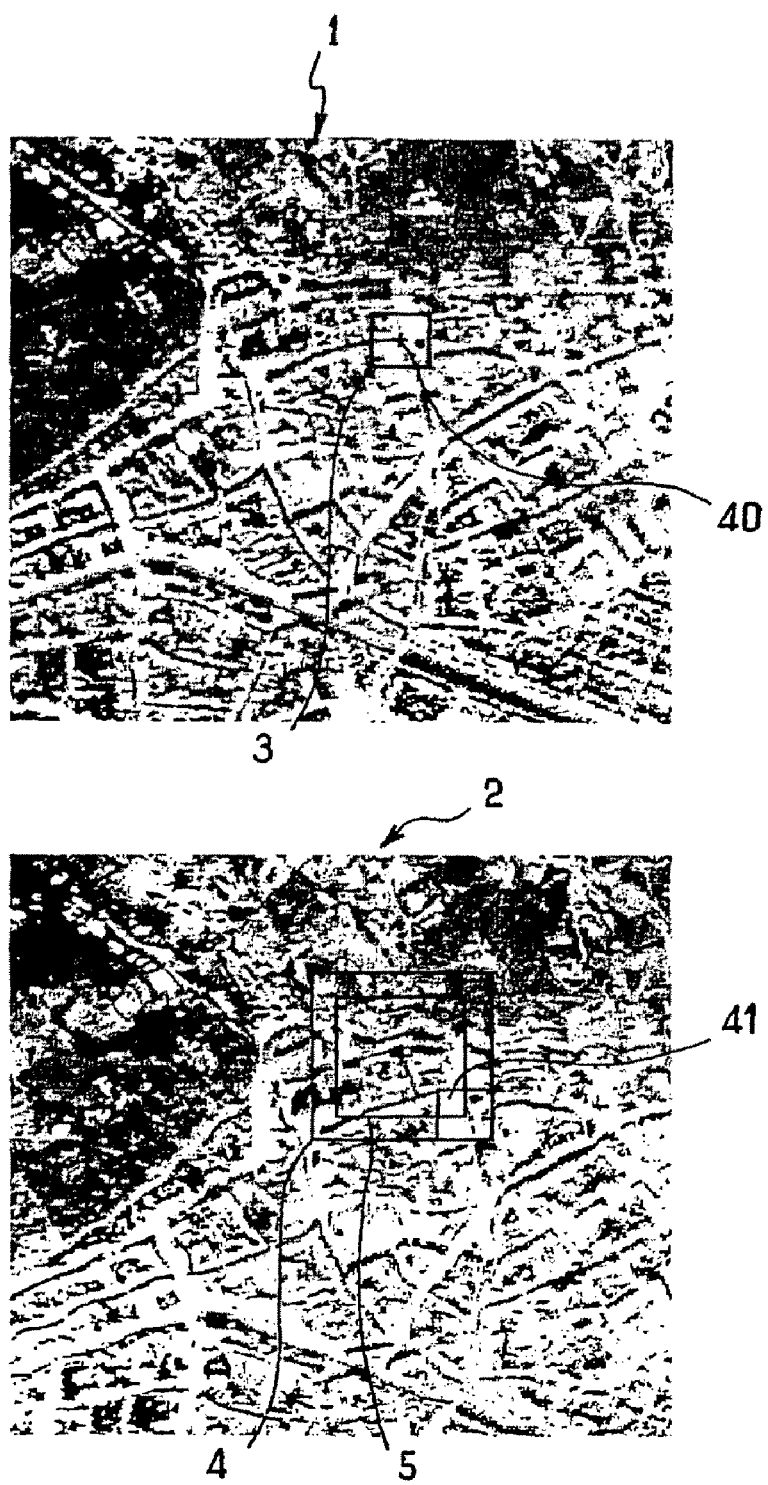
FIG. 1 illustrates a scene shown as a stereopair.
Figure 7:
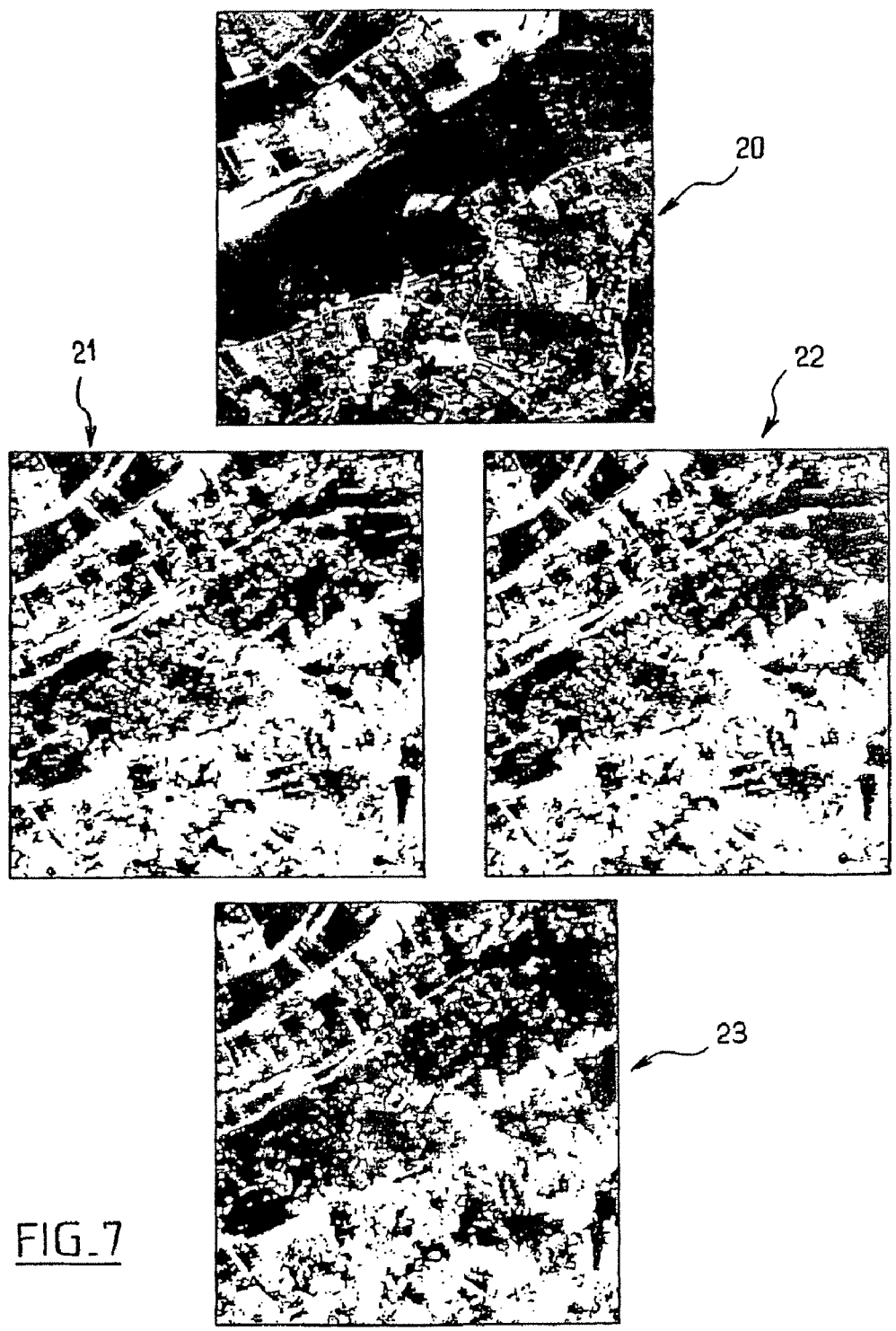
FIG. 7 illustrates a view of a scene, points in the scene that are preserved after applying a row criterion, points in the scene that are preserved after applying a column criterion, and points in the scene that are preserved after applying a row and a column criterion.

FIG. 7 shows the mask 23 for the points retained after applying the geometrical curvature criterion to the countryside-type image 20 with a prolate 9×9 window. This mask 23 for the retained points is obtained by making the mask 21 for the retained points after application of the row criterion intersect with the mask 22 for the retained points after application of the column criterion.

The black areas in the image correspond to the points that have been rejected after applying the morphological condition. The white points represent the retained points. The images in FIG. 7 are shown in black and white for displaying the retained points better.

As illustrated in FIG. 7, the mask 21 applied as row criterion has 57.29% of the points retained, the mask applied as column criterion has 53.52% of points retained and, finally, the mask 23, which is the intersection of the above two masks, has only 45.64% of points retained. This illustration confirms the not insignificant advantage of using the epipolar reference frame, which implies a unidirectional morphological condition.

4. Multidirectional Fine Correlation Method

The image thus interpolated is then analyzed along its orthogonal direction. This method is iterated.

5. Method for Matching Implemented on the Basis of the Fine Correlation Model

The computation method, based on the fine correlation method described above, will now be explained in detail with reference to FIG. 11. The correlation method is automatically tailored to the image as soon as the correlation curvature signal-to-noise ratio $SNR_C$ has been set.

This computation is a dyadic multiscale (multiple levels of resolution) method. This means that the processing takes place for various levels of resolution. The number of levels of resolution is known as soon as the maximum position difference along a row and along a column is known.

The computation method based on the fine correlation method is multidirectional. The sizes of the prolate correlation windows are automatically computed at any point and for all the levels of resolution with correlation windows that may be very different in the epipolar direction from the orthogonal direction. They are set by the correlation curvature signal-to-noise ratios that are different along the epipolar direction and the orthogonal direction. The method will be to increase the levels of resolution, that is to say going from the coarsest resolution to the finest resolution.

A. Data:

The first step of the method consists of the acquisition of the input data. To use the method, the necessary input data are the following:

the stereopair, namely the first image and the second image. These two images are acquired using a particular acquisition system described in more detail in the rest of the document. This system allows the acquisition of a pair of images for a low stereoscopic coefficient. This acquisition system is a single instrument comprising two CCD sensors, each sensor allowing acquisition of one image of the stereopair;

the standard deviation of the noise and the type of MTF function (given): namely "prolate", "SPOT5", "hypo-mode", etc.;

the images of the stereopairs are expressed in row or column epipolar directions; and the value of the maximum position difference along the epipolar lines and the value of the maximum position difference along the orthogonal direction. These values represent the maximum shift thresholds along the two processing directions, between a point in the first image and its homologous point in the second image. These values make it possible to determine the number of levels of resolution that are needed to find the point in the second image that is homologous with a point in the first image.

B. User Parameters

In the next step, the user is invited to input an exhaustiveness parameter for the method, namely:

the choice of correlation heel signal-to-noise ratio (SNR) along the epipolar direction and the choice of a correlation heel SNR along the orthogonal direction, namely $SNR\_e$ and $SNR\_o$. Preferably, $SNR\_e=10$ and $SNR\_o=100$. These $SNE\_e$ and $SNR\_o$ parameters serve as threshold values in determining, at each point in the first image, an optimum size for the correlation window along each processing direction.

C. Algorithm Parameters

A number of other parameters are preset:

the maximum radius of the circular correlation prolate function. This radius is the threshold that defines the maximum size allowed for the correlation window. This maximum radius will preferably be equal to 25 for a times-two image zoom;

the number of iterations for each processing direction, preferably equal to 2;

the number of iterations when filling in the missing parts of the disparity map. This is because the method makes it possible to define the position differences between the points in the first image and their respective homologous points in the second image. All the measured position differences are placed in a disparity map. However, among these disparities, those that do not meet a similarity criterion are rejected. The disparity map therefore has points for which the position difference between a point in the first image and its homologous point in the second image is of unknown value. These points of unknown value in the disparity map are called missing parts, and the number of iterations when filling in these points is preferably equal to 10; and the times-2 zoom of the stereopair at all levels of resolution.

D. Initialization

Certain parameters are set on the basis of input data. The number of levels of resolution along the epipolar direction $S\_e$ and the orthogonal direction $S\_o$ is therefore computed as a function of the maximum position difference values (along the two processing directions) obtained during phase A. The number of dyadic levels of resolution needed is computed using the abovementioned formula consisting of the logarithm to the base 2 of the maximum row and column position differences, namely:

$S\_e = \log_2$(maximum value of the disparity along the epipolar direction);

$S\_o = \log_2$(maximum value of the disparity along the orthogonal direction).

Moreover, the input images are to be filtered, during the first pass around the main processing loop of the correlation method. This makes it possible to reduce input image noise. Therefore the following are carried out:

filtering of the stereopair by convolution with a convolution window. Preferably, this convolution window will be a circular prolate function of radius equal to 7. This operation of filtering the first and second images of the stereopair makes it possible to regularize the points in these images;

filtering of the noise image by convolution with a convolution window. This convolution window will preferably be of the circular prolate type with a radius of preferably equal to 7. The benefit of this operation is again a regularization of the points in the noise image; and interpolation within the epipolar geometry of the pair of images. The images of the stereopair are resampled in epipolar geometry along the rows or columns by interpolation.

E. Processing for Each Level of Resolution

The images of the stereopair are then processed in levels of dyadic resolution, alternately, if required, along the epipolar direction and the direction orthogonal to the epipolar direction (depending on the depth of processing in levels of resolution along the row and the column). The processing starts with the coarsest level of resolution and progressively moves toward the finest level of resolution. The following steps will be carried out for each level of resolution and are divided into two categories, which are the data preparation and the correlation of the stereoscopic images:

E.1 Data Preparation

The data preparation step is carried out by performing the following steps:

the convolution of the images of the stereopair by the prolate function (a circular prolate function preferably of size equal to 7 for the level of resolution 1, and a separable prolate function for the other levels). This convolution makes it possible to reduce the resolution of the initial images of the stereopair;

the times-two zoom of the first image, the second image and the noise image. This times-two zoom is performed by interpolation using a sinc-type function. The interpolation operation consists, for each interpolated image, in:

doubling the number of row points by inserting a point of unknown value between two points of known value in the image, doubling the number of column points by inserting a point of unknown value between two points of known value in the image, and displacing a weighted window of the sinc type at each point of unknown value (the point of unknown value being located at the center of the window) and estimating the value of this point using the points of known value thanks to this weighted window;

the determination of the optimum correlation window (i.e. of smallest size). To do this, the correlation curvature signal-to-noise ratio $SNR_c$ is computed at all points in the first image as a function of the correlation (circular prolate) window. Next, the smallest correlation window, along the epipolar and perpendicular directions, which meets the condition $C_v/C_b > SNR_c$, is chosen. This determination is carried out by performing, at each point in the image, the following steps:

computation of the noise correlation curvature $C_b$ in the noise image for each prolate correlation window size. This computation is carried out using the correlation curvature formula mentioned when presenting the unidirectional fine correlation model, computation of the correlation curvature of the first image for each prolate correlation window size, computation for each prolate correlation window of the correlation curvature signal-to-noise ratio ($SNR_c$) relative to the preceding curvatures, and choice (and storage in memory) of the smallest size of prolate correlation window such that $|C_v/C_b| > SNR\_e$ and $|C_v/C_b| > SNR\_o$ (for example if a 16×16 size correlation window and an 8×8 size correlation window satisfy $|C_v/C_b| > SNR\_e$ and $|C_v/C_b| > SNR\_o$ then the 8×8 size correlation window will be chosen).

E.2 Correlation of the Stereoscopic Images

Once the data has been prepared, the data processing step is carried out. This step comprises the following substeps, some of which are illustrated in FIG. 12. These substeps are repeated for each point in the image and along each processing direction.

For each point in the first image, and for each processing direction, the following are carried out:

the interpolation of the second image with the cumulative-disparity map found after the preceding iteration, that is to say for the preceding level of resolution. This interpolation of image 2 is performed using the disparity map;

computation (3000) of the position difference d between the current position 2002 in the first image 2000 and its assumed radiometrically homologous point 2004 in the second image 2001. This computation is performed by correlation within the weighted correlation window 2003. To do this, the correlation window 2003 is centered on the current point 2002 in the first image 2000 and the correlation window 2003 is moved to the search area 2006 in the second image 2001. The search area 2006 is centered (in the second image) on a point O geometrically homologous to the current point 2002 in the first image 2000. The position difference for which the correlation value is a maximum is adopted.

This computation is carried out for all the points in the first image 2000 and makes it possible to obtain an intermediate disparity map 2005 (i.e. a map in which in particular the barycentric correction technique has not been applied). The following are then carried out:

the barycentric correction (3001) for each level of resolution at the point close to the intermediate disparity map 2005. This makes it possible to limit the impact of the abovementioned correlation adhesion effect. The barycentric correction step comprises, at a point, the steps consisting in:

determining the barycenter G of the points in the first image 2000 that are contained within the correlation window 2003 that has been used for determining the position difference between the current point 2002 in the first image 2000 and its homologous position 2004 in the second image 2001, and assigning to this barycenter G the value of the position difference d of the current point in the disparity map 2005.

Thus, during the barycentric correction step, the value of the position difference computed for the current point is shifted, in the disparity map, to the position of the barycenter of the points in the first image that are contained within the correlation window (used for computing the position difference between the current point and its assumed radiometrically homologous point).

Once the barycentric correction has been made, for the same resolution:

rejection of the points coming from windows larger in size and containing windows of smaller size. This is because the correlation at this point using the larger correlation window is necessarily of lower precision;

rejection of the homologous points of excessively different radii of curvature after interpolation of the position in the second image. To do this, the following are carried out for each resolution and each direction:

computation of the correlation curvature of the current point (point under investigation) in the first image, computation of the correlation curvature of the point in the second image that is homologous with the current point in the first image, computation of the difference between the curvatures computed above (difference between the correlation curvatures of the current point and of its homologous point in the second image), computation of the minimum curvature difference between the correlation curvatures of the four neighbors (in the first image) at the current point and the correlation curvature of the current point, and rejection of the homologous point if the curvature difference between the current point and its homologous point is greater than the smaller difference computed on the four neighbors of the current point in the first image; and iterative filling-in (preferably 10 iterations) of the missing disparity maps passing through the existing points. It has been seen that the homologous points of excessively different curvature differences were rejected. Consequently, certain points in the disparity map will be of unknown value. Therefore iterative filling-in of the disparity map is carried out. In addition, the barycentric correction produces holes (points in the map where the position difference is an unknown value), since the position difference of one point may be assigned (or translated) to another point during the barycentric correction. To do this, the following are carried out:

convolution by a prolate convolution window, filling-in of the points of unknown value of the disparity map by convolution using a prolate function;

smoothing of the disparity map by a separable prolate function corresponding to the current level of resolution (a circular function at the level of resolution of the image). This smoothing makes it possible to remove noise from the disparity map; and composition of the table of current position differences with that computed from the preceding (cumulative) iteration. This composition makes it possible to update the disparity map computed for the preceding level of resolution.

The processing is carried out for all the levels of resolution, eliminating points computed with a prolate correlation window containing a smaller prolate correlation window, and doing so along both processing directions. What is therefore obtained as output of the method is the disparity map for the finest level of resolution.

F. Outputs

At the end of the last step of the method, the output data of the method is obtained. This consists of tables of sizes equal to the size of the first and second image. These tables are:
the disparity map (2 tables); and
the prolate size map (2 tables) at any point of unknown value (nonrejected point) in the first image at the finest level of resolution (the finest level of resolution being the level of resolution of the input images).

The method presented above is implemented in a stereopair acquisition and matching unit. This acquisition and matching unit comprises an acquisition system and a processing system. This acquisition and processing unit allows acquisition and processing of a stereopair having a low stereoscopic coefficient. The acquisition and processing unit has the advantage of limiting the hidden parts, that is to say parts appearing only in one of the two images, and for example seeing the streets in an urban environment comprising skyscrapers.

The acquisition system may be integrated into or far apart from the processing system. When the acquisition and processing systems are far apart, they communicate via wire or wireless communication means.

The acquisition system allows the acquisition of the input data of the method (step A of the method). This acquisition system is for example a satellite and includes communicating means (for communicating with the processing system), processing means (of the processor type), memory means (for storing the acquired images) and an optoelectronic detector (optical system+CCD sensors).

The processing system is programmed to carry out the steps of the matching method described above. This processing system itself allows the matching of the stereopair to be carried out. The processing system is for example a workstation that includes memory (RAM, ROM) means that are connected to processing means, such as a processor, display means, such as a display screen, and inputting means, such as a keyboard and a mouse. The processing system is connected to communication means so as to receive the images to be matched that are required by the acquisition system.

A comparison of the fine correlation method with methods not involving the times-two zoom of the stereopair, the modeling of the correlation with barycentric correction and the multiscale (multiple levels of resolution) computation of the maximum of the correlation sheet is proposed on the basis of simulations presented in FIG. 7.

The results obtained by four stereopair matching methods are presented (FIG. 8: precision as a function of b/h), these methods being: the standard correlation method using a prolate correlation window (26); the standard correlation method using a constant correlation window (25); the fine correlation method using a prolate correlation window (27); and the fine correlation method using a prolate correlation window with the points resulting from windows including smaller windows being removed (28).

The images of the stereopair are images of Marseilles having a sampling pitch of one meter with a transfer function complying approximately with the Shannon principle (value close to 0 at the cutoff frequency). The signal-to-noise ratio of the images is equal to 100.

The acquisition of the images of the stereopair is a matrix acquisition. These images are computed from an orthophotograph sampled at one meter and from a numerical model of the terrain with submetric precision covering the same area.

Stereopairs are generated for several b/h values. This coefficient takes values between 0.005 and 0.25. This coefficient is caused by the single aim-off in pitch mode.

Figure 8:
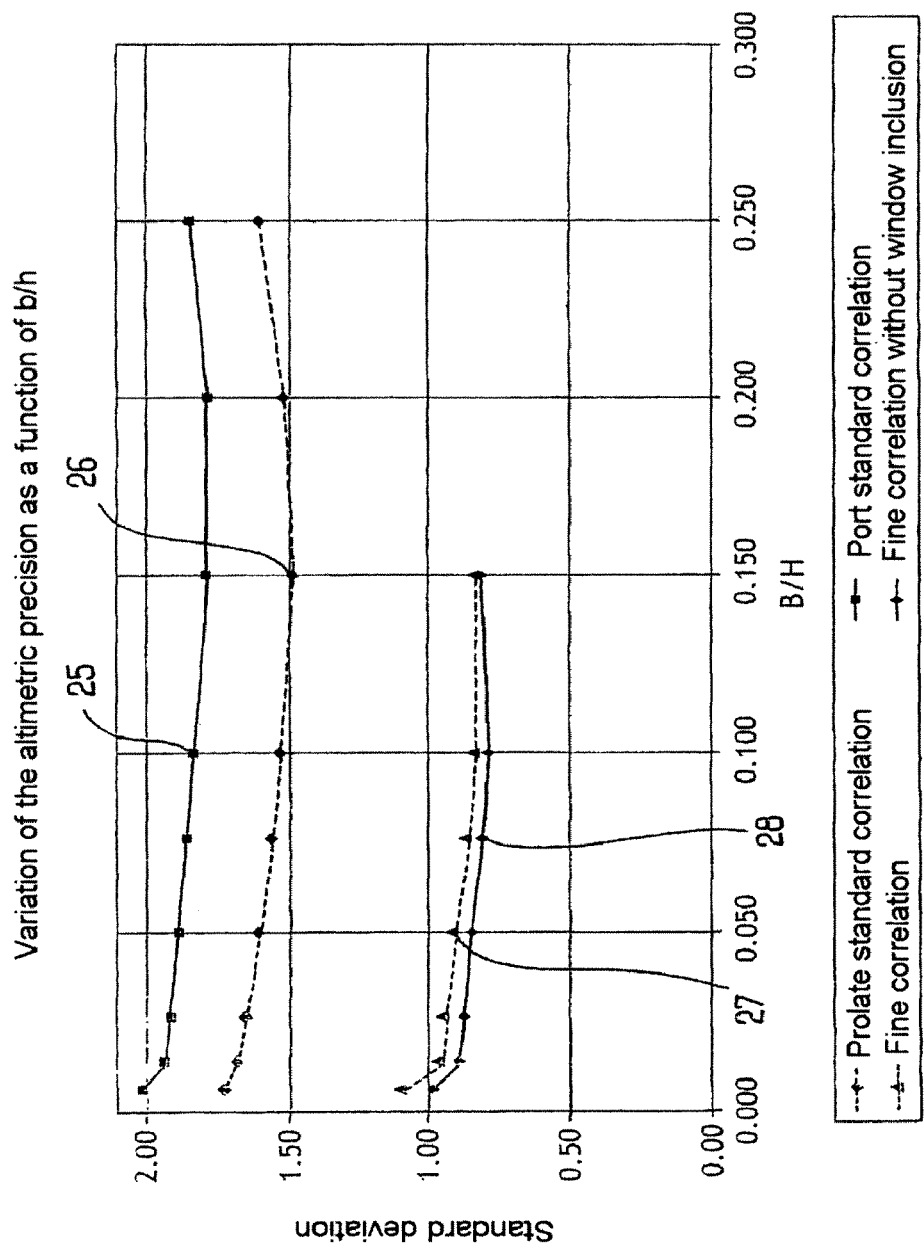
FIG. 8 is a graph of the variation in the altimetric precision as a function of the stereoscopic coefficient before different stereopair matching methods (square windows, prolate windows and prolate windows+barycentric correction)

As shown in FIG. 8, the precision with the fine correlation method is twice as good as that measured with the conventional method. In addition, it may be considered that the fine correlation has a constant precision for b/h values between 0.01 and 0.15. The altimetric precision, the standard deviation of which is plotted here on the y-axis with the pixel as unit, is better than one pixel. This method contains subpixel precision with small stereoscopic coefficients (b/h).

Moreover, the recommended method, namely fine correlation without inclusion of windows, makes it possible to reject shadow points that are often aberrant. The degree of correlation is close to 1 if the shadow effect is neglected.

The stereopair matching method described above therefore allows stereoscopic images to be processed for a small stereoscopic coefficient (low b/h) with the same altimetric precision as for large stereoscopic coefficients. This method operates down to very small stereoscopic coefficients (0.01) without the altimetric precision being degraded.

This fine correlation method is carried out in the processing system of the stereopair acquisition and matching unit.

This method permits a novel design of space acquisition/photographing systems for acquiring stereopairs. A stereoscopic coefficient (b/h) close to 0.02 limits the homologous lines of sight of the CCD sensors to a value of less than ±1°.

Figure 9:
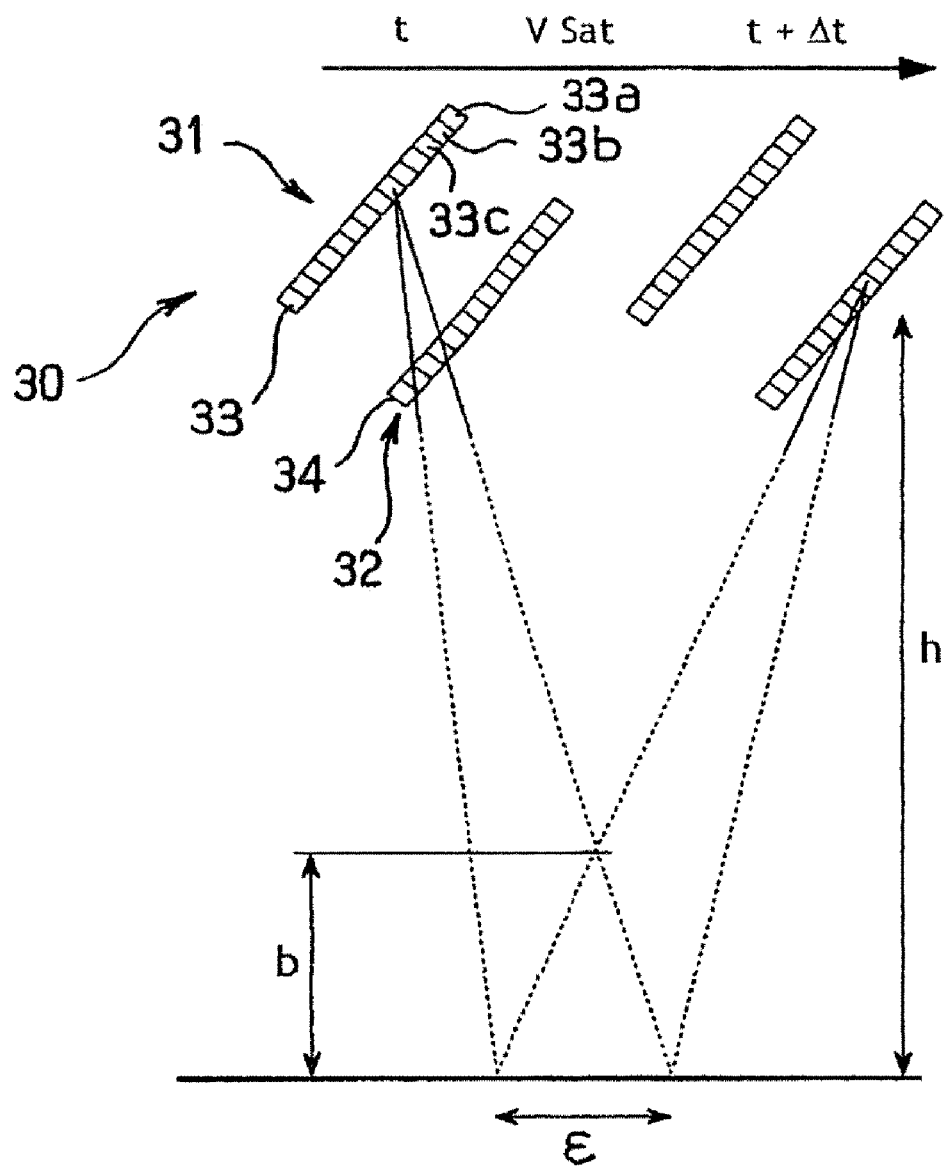
FIG. 9 illustrates a view of an instrument dedicated to the stereoscopy.

A novel type of space acquisition system for the acquisition of stereopairs is shown in FIG. 9.

Unlike the acquisition systems of the prior art, the acquisition system according to the present invention comprises a single acquisition instrument (not shown) comprising a single optical system (not shown) and two symmetrical CCD sensors 31, 32 in the optical focal plane.

Each CCD sensor shown in FIG. 9 is a linear array consisting of detectors 33a, 33b, 33c. These detectors 33a, 33b, 33c are, for example, CCD light-sensitive electronic photodiodes for converting the light signal into an electric current proportional to the intensity of this light. These detectors 33a, 33b, 33c are placed side by side along a line, and form the linear array 33. Each detector 33a, 33b, 33c is responsible for the observation of one pixel. Each detector 33a, 33b, 33c captures the light coming from one pixel of the terrain.

The operating principle of such a stereoscopic image acquisition system in the spatial case is the following.

Each linear array 33, 34 allows the acquisition of one row of the image. The linear array 33 allows the acquisition of one row of the first image and the linear array 34 the acquisition of one row of the second image.

The first and second images of the stereopair are therefore acquired row by row by the linear CCD arrays 33, 34 as the satellite moves around its orbit (between time t and t+Δt).

The rows of images acquired by the first and second linear arrays 33, 34 are stored in memory means.

Once the two images 1, 2 have been acquired, the acquisition system sends (via wireless communication means) the stereopair of images 1, 2 to the processing system. This processing system is preferably based on the ground and allows the points in the stereopair to be matched.

In the case of an acquisition system in space, the two linear arrays introduced into the focal plane may be replaced with two matrices (each matrix consisting of a set of CCD detectors distributed in rows and columns) also lying in the focal plane.

This may also be carried out using a non-space camera. In the case of a camera, the stereopair acquisition system will include an optoelectronic sensor comprising a single optical system and two symmetrical CCD sensors in the focal plane.

The fine stereopair matching method employed in the processing system remains valid for acquisition systems comprising a single space instrument consisting of two matrices or two linear arrays whenever the attitude perturbations are corrected or negligible.

The invention claimed is:

1. A processing method for the acquisition and matching of a stereopair of images (1, 2) including acquiring a stereopair of images and processing the stereopair acquired, the processing method comprising:
   processing a first image and a second image (1, 2) of the stereopair in at least one processing direction and at various levels of resolutions, from a coarsest to a finest,
   obtaining, for the finest level of resolution, a map of disparities between each point in the first image (1) and its radiometrically homologous point in the second image (2),
wherein the processing of the first image and second image includes the substeps of:
   determining, at each point in the first image (1), one optimum correlation window (3) so as to obtain a plurality of determined correlation windows for the points of the first image,
   computing, by correlation with the determined correlation windows, position differences between each point (40) in the first image (1) and its radiometrically homologous point (41) in the second image (2),
   obtaining, for a current level of resolution, a map of disparities between each point (40) in the first image and its radiometrically homologous point (41) in the second image, and
   carrying out a barycentric correction operation on the points on said map obtained by said obtaining
said substeps being performed for each level of resolution.

2. The processing method as claimed in claim 1, further comprising:
   convoluting the first image and the second image (1, 2) of the stereopair via a convolution window; and
   performing a size-2 zoom on the first image and second image (1, 2) of the stereopair.

3. The processing method as claimed in claim 1, characterized in that the determining the optimum correlation window at each point in the first image comprises:
   computing a curvature of the first image for each correlation window size (3),
   computing a curvature of a noise image for each correlation window size (3), and
   computing, for each correlation window size, a ratio (SNRc) of the above curvatures; and
   choosing a smallest correlation window size such that said ratio is greater than an exhaustiveness parameter input by a user.

4. The processing method as claimed in claim 1, further comprising performing an interpolation on the second image (2) using a disparity map obtained for a preceding level of resolution.

5. The processing method as claimed in claim 4, further comprising:

rejecting homologous points (40, 41) resulting from larger correlation windows (3) and containing smaller correlation windows (3);
rejecting homologous points (40, 41) of radii of curvature that meet a rejection condition after extrapolation of the second image (2);
iteratively adding, in the disparity map corresponding to the current level of resolution, missing position difference points as a function of existing position difference points;
smoothing the disparity map corresponding to the current level of resolution via a convolution window; and
constructing the disparity map computed for the current level of resolution from the disparity map computed for the preceding level of resolution so as to update said disparity map computed for the preceding level of resolution.

6. The processing method as claimed in claim 1, further comprising:
   rejecting the homologous points that meet a rejection condition, said step of rejecting the homologous points comprising the substeps of:
      for the current point, computing, in the first image (1), the curvatures of its two neighboring points along each processing direction;
      for the current point, computing a smaller difference of the curvatures of four points associated with the current point in the first image (1);
      for the current point, computing, in the second image (2), its homologous point interpolated via the disparity map;
      for the current point, computing the difference between its curvature and the curvature of the homologous point; and
      for the current point, rejecting the homologous point if this difference is greater than the computed smaller difference on the first image (1).

7. A method for matching a stereopair of images comprising the following steps:
   processing a first image and a second image (1, 2) of the stereopair of images, along at least one processing direction and at various levels of resolutions from a coarsest to a finest,
   obtaining, for the finest level of resolution, a map of disparities between each point in the first image (1) and its radiometrically homologous point in the second image (2),
wherein the processing step comprises the substeps of:
   determining, at each point in the first image (1), one optimum correlation window (3) to obtain a plurality of determined correlation windows for the points of the first image,
   computing, by correlation with the determined correlation windows, position differences between each point (40) in the first image (1) and its radiometrically homologous point (41) in the second image (2),
   obtaining, for a current level of resolution, a map of disparities between each point (40) in the first image and its radiometrically homologous point (41) in the second image, and
   performing a barycentric correction operation on the points of said map obtained by said obtaining;
said substeps being performed for each change of level of resolution.

8. The method as claimed in claim 7, characterized in that the method further includes the step of:

acquisition of a stereopair of images (1, 2) using a single acquisition instrument (30) designed to operate with stereoscopic coefficients of a few hundredths and comprising two CCD sensors (31, 32) in an optical focal plane (19'), each sensor (31) allowing the acquisition of one image (1) of the stereopair.

9. The method as claimed in claim 7, characterized in that the method includes processing the first image and the second image (1, 2) of the stereopair along an epipolar direction.

10. The method as claimed in claim 7, characterized in that the method includes processing the first image and the second image (1, 2) of the stereopair along an epipolar direction and a direction orthogonal to the epipolar direction.

11. The method as claimed in claim 7, characterized in that the method further includes a step in which a user inputs at least one exhaustiveness parameter corresponding to a choice of a correlation signal-to-noise ratio along each processing direction.

12. The method as claimed in claim 11, characterized in that the step of determining the optimum correlation window comprises, for each point in the first image:
   computing a curvature of the first image for each size of the correlation window (3);
   computing a curvature of the noise image for each size of the correlation window (3); and
   computing, for each size of the correlation window, the (SNRc) ratio of preceding curvatures; and
   choosing the smallest correlation window size such that said ratio is greater than each exhaustiveness parameter input by the user.

13. The method as claimed in claim 7, characterized in that the method further includes acquiring:
   a noise image;
   a type of correlation window;
   an epipolar direction for each image (1, 2) of the stereopair for a mean stereoscopic coefficient; and
   at least one value of a maximum position difference along each processing direction.

14. The method as claimed in claim 13, characterized in that the method further includes a data preprocessing step comprising:
   computing a number of levels of resolution along each processing direction as a function of each value of the maximum position difference;
   filtering the first image and the second image (1, 2) of the stereopair by convolution via a convolution window;
   filtering the noise image by convolution via said convolution window; and
   interpolating the first image and the second image (1, 2) of the stereopair in an epipolar geometry.

15. The method as claimed in claim 7, characterized in that the processing step further includes:
   performing a convolution on the first image and the second image (1, 2) of the stereopair via a convolution window; and
   performing a size-2 zoom on the first image and the second image (1, 2) of the stereopair.

16. The method as claimed in claim 7, characterized in that the processing step further comprises performing an interpolation on the second image (2) using a disparity map obtained for a preceding level of resolution.

17. The method as claimed in claim 16, characterized in that the processing step further comprises:
   rejecting homologous points resulting from larger correlation windows containing smaller correlation windows;
   rejecting homologous radius of curvature points (40, 41) meeting a rejection condition after interpolation of the second image (2);
   iteratively adding, in the disparity map corresponding to the current level of resolution, missing position difference points as a function of existing position difference points;
   smoothing the disparity map corresponding to the current level of resolution via a convolution window; and
   compiling the disparity map computed for the current level of resolution from the disparity map computed for the preceding level of resolution so as to update said disparity map computed for the preceding level of resolution.

18. The method as claimed in claim 17, characterized in that the step of rejecting the homologous points meeting a rejection condition comprises, for the current point:
   computing, in the first image the curvatures of its two neighboring points along each processing direction;
   computing a smaller difference of the curvatures of four points associated with the current point in the first image;
   computing, in the second image, its homologous point interpolated via the disparity map;
   computing the difference between its curvature and the curvature of the homologous point; and
   rejecting the homologous point if this difference is greater than the computed smaller difference on the first image.

19. The method as claimed in claim 7, characterized in that the step of generating the disparity map for the finest level of resolution comprises generating:
   at least one table representative of the map of the disparities along each processing direction; and
   at least one table representative of a map of the correlation window sizes employed at any unrejected point in the first image, along each processing direction.

20. The method as claimed in claim 7, characterized in that the convolution and correlation windows used are convolution and correlation windows of the prolate type.

21. An assembly for the acquisition and matching of a stereopair of images (1, 2), comprising a system for the acquisition of a stereopair of images and a system for processing the stereopair acquired, characterized in that the system for acquisition of the stereopair comprises a single acquisition instrument (30) comprising two CCD sensors (31, 32) in the optical focal plane, each CCD sensor (31, 32) allowing the acquisition of one image (1, 2), the processing system comprising a processor and a memory storing a program which when implemented perform the following method steps:
   processing a first image and a second image (1, 2) of the stereopair in at least one processing direction and at various levels of resolutions, from a coarsest to a finest,
   obtaining, for the finest level of resolution, a map of disparities between each point in the first image (1) and its radiometrically homologous in the second image (2), the processing step comprising the substeps of:
      determining, at each point in the first image (1), one optimum correlation window (3) so as to obtain a plurality of determined correlation windows for the points of the first image,
      computing, by correlation with the determined correlation windows, position differences between each point (40) in the first image (1) and its radiometrically homologous (41) in the second image (2),
      obtaining, for a current level of resolution, a map of the disparities between each point (40) in the first image and its radiometrically homologous (41) in the second image, and
      carrying out a barycentric correction operation on the points on said map obtained;
   said substeps being performed for each change of level resolution.

* * * * *